Ernest L. Myers
Rex Eells
INVENTORS

Ernest L. Myers
Rex Eells
*INVENTORS*

BY W. T. French
George P. Chandler
ATTORNEYS

United States Patent Office 3,490,193
Patented Jan. 20, 1970

3,490,193
VACUUM PLATEN FOR TRANSPARENT FILM PACKAGING
Rex Eells and Ernest L. Myers, Kingsport, Tenn., assignors to Eastman Kodak Company, Rochester, N.Y., a corporation of New Jersey
Filed May 18, 1967, Ser. No. 639,480
Int. Cl. B65b 55/00
U.S. Cl. 53—22                                                    16 Claims

ABSTRACT OF THE DISCLOSURE

A vacuum platen having selected areas on its surface vented to the atmosphere so that the degree of vacuum produced in these areas is reduced substantially or eliminated. In utilizing this platen for packaging, a porous substrate is laid on the upper surface of the platen with the articles to be packaged positioned over the areas on the platen which are vented to the atmosphere. A softened film is then placed over the articles on the substrate and a vacuum applied to the platen whereupon the film is drawn into adhering contact with the substrate in the areas subject to vacuum from the platen. In those areas surrounding the packaged article in which the degree of vacuum has been substantially reduced, the thermoplastic film is not subjected to excessive film draw-down thereby eliminating breaking or thinning of the sheet, and ridging or puddling.

---

This invention relates to a vacuum platen especially adapted for use in film packaging apparatus and more particularly relates to a vacuum platen in which the degree of vacuum produced in certain portions thereof is reduced so that the amount of film draw-down in those areas can be controlled.

Transparent film packaging has, in the last few years become one of the fastest growing segments of the merchandizing and packaging industry. This fast growth is based on the fact that film packaging is relatively inexpensive, easy to accomplish, and has the decided advantage that while the product packaged is protected, it is also visible through the film while on display at the point of sale. This type of packaging has been widely utilized for packaging toys, hardware, kitchen utensils, glassware and so forth. It is adaptable for use in packaging almost any article which is not too bulky for the packaging apparatus itself.

In general, transparent film packaging consists of placing the article to be protected onto a substrate of a porous material such as paperboard, covering the article and substrate with a softened and flexible thermoplastic film, drawing a vacuum through the porous substrate causing the film to be brought into contact with the article to be secured to the substrate. In order to promote adhesion between the film and the substrate, there may be a primer coating such as cellulose nitrate, for example, on the substrate. As a finished product the package consists of a cardboard substrate and article both completely covered by a transparent film so that while the article is completely protected, it and any advertising or printed matter on the substrate are completely visible.

In order to create or draw a vacuum through the substrate the film packaging apparatus includes a platen having a support surface upon which the substrate rests while the packaging operation takes place. This platen generally has a plurality of apertures opening onto the upper surface and extending into a chamber in which a vacuum can be created. Thus, during the packaging operation air is drawn through the apertures and substrate from the space between the packaging film and the substrate creating a vacuum therebetween so that the two will be forced into tight contact by the pressure of the atmosphere around the platen. Apparatus of this nature is shown in United States Patent No. 2,855,735.

It has been found that when drawing the film into contact with the substrate, that portion of the film around the article being packaged is drawn-down and thinned excessively, often to the breaking point, or ridges or puddles are formed around the article. These defects occur because of the high degree of vacuum existing between the substrate and the film which tends to force the film toward the substrate and because it is in a somewhat flowable state also deforms the film.

In order to prevent this excessive draw-down of the film in the area of the article to be packaged, many expedients have been tried. As shown in United States Patent No. 2,984,056 the substrate may be left impervious in the area of the article to be packaged so that no vacuum is formed as that location. It is apparent that it is rather difficult to manufacture a substrate which is air permeable only over portions of its surface. Therefore, other expedients have been undertaken such as printing an impervious coating on the packaging substrate immediately beneath the position of the article. This method has proved to be not entirely satisfactory since it is difficult to apply enough sealing material by printing to effectively seal the substrate against a flow of air. Furthermore, in this method the substrate must be passed through a printing press to place any advertising matter on the surface and then passed through another printing press to apply the sealing material. This necessitates an extra step in the package manufacturing process which is time consuming and expensive.

According to our invention the above enumerated prior art difficulties are overcome by controlling with the platen the amount of vacuum drawn through the substrate in the areas on which the articles to be packaged are placed. This control is achieved by venting those areas on the platen corresponding to article placement to the atmosphere. It is apparent that the vacuum produced in those areas vented to the atmosphere will be substantially reduced or eliminated. Thus, in those areas the amount or sheet draw-down breakage, ridging, and puddling will be reduced to a significant degree.

In one embodiment of the invention the platen consists of an upper portion having a plurality of spaced slots milled therein forming a waffle-like grid pattern. Disposed within these slots at closely spaced intervals are apertures which lead into a cavity beneath the grid. This cavity is vented to the atmosphere while a second cavity in the platen having apertures extending into the border of the waffle-like grid, is connected to a device for creating a vacuum. Those areas of the platen which are to be maintained at atmospheric pressure are isolated from the other areas of the platen by resilient strips which are removably fitted into the slots of the platen in air tight relationship therewith. In those areas of the platen in which a vacuum is to be created, the apertures to the cavity at atmospheric pressure are blocked by air impervious tape or gaskets. Thus, a porous substrate placed on the upper surface of this platen will have selected areas through which a vacuum is drawn and selected areas which are generally at atmospheric pressure accomplishing the desired results of controlling the degree of vacuum at the point of article placement.

In another embodiment of the invention the upper portion of the platen is a screen installed above and extending across a chamber in which a vacuum is created. Disposed within the chamber and immediately below the screen of the upper portion is a compartment corresponding in size, shape and position to each article which is to be packaged on the porous substrate. Each of these compartments is vented to the atmosphere and opens onto the screen of the upper portion so that those areas on the supporting surface immediately above the compartments is at atmospheric pressure or at least a reduced degree of vacuum.

In still another embodiment of the invention the platen is divided into three portions including an upper portion and first and second cavities. A vacuum is created in one of the cavities while the other cavity is vented to the atmosphere. Both cavities have conduits extending therefrom and opening into the upper portion. The upper portion is then divided into areas which are maintained at atmospheric pressure and into areas in which a vacuum is created by isolating the openings from the two cavities from one another by a resilient, air impervious, gasket-like material formed into the outline of the article to be packaged. Each outline of gasket material must have at least one opening from the vented compartment lying within its borders. Generally, although not absolutely necessary, if a conduit from the cavity in which the vacuum is created lies within the borders of the outline, it is plugged.

This invention can be more fully understood from the following detailed description of the preferred embodiments thereof when read in reference to the accompanying drawings in which.

In order to better understand the construction and use of this novel vacuum platen it will be described in relation to utilization with film packaging. It is to be understood, however, that various other uses may be found for this novel vacuum platen. For example, it could be utilized as a source of vacuum in bonding operations in which intricate shapes are adhered together by the use of an adhesive. Other uses will be readily apparent to those skilled in the art.

Figure 1:
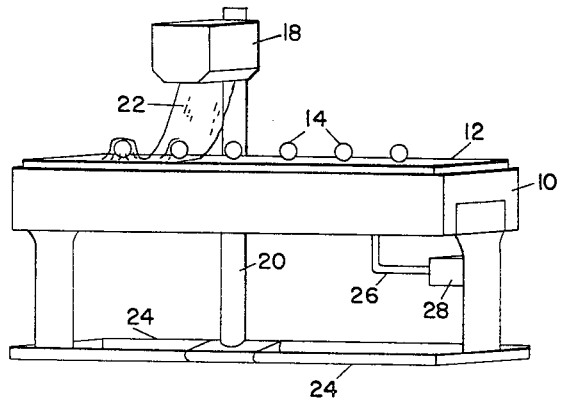
FIGURE 1 illustrates generally the environment in which our novel platen is to be found and shows a substrate supporting articles to be packaged resting on the platen as a film of material is placed across its upper surface covering the articles.

With continued reference to the accompanying figures wherein like numerals designate similar parts throughout the various views, and with initial attention directed to FIGURE 1, reference numeral 10 designates generally a vacuum platen in accordance with this invention. One method of utilizing such a platen 10 is illustrated in FIGURE 1 in which a porous substrate 12 having articles such as toy balls resting thereon is supported on the upper portion of the platen 10 so as to be in fluid flow communication therewith as will be more fully described hereinafter. The nature of the porous substrate is well known in the packaging art and is believed to require no further description. A distributing head 18 containing a supply of film in the molten state or in sheet form is movably disposed above the platen 10 on a pedestal 20. The film 22 is placed across the substrate 12 and the articles 14 by sliding the pedestal 20 and head 18 the length of platen 10 on tracks 24. After the film 22 is in place or as it is being placed across substrate 12 and articles 14, a vacuum is applied to the platen 10 through pipe 26 connected to a device 28, such as a pump, for creating such and the film is drawn into tight engagement with the substrate 12 completely covering the articles 14. The particular films utilized are not an essential part of my invention and are well known in the art. It is believed sufficient to state therefore that the film 22 can be either in a softened sheet form or a molten curtain which assumes a less flowable state as it cools while falling into place.

Figure 2:
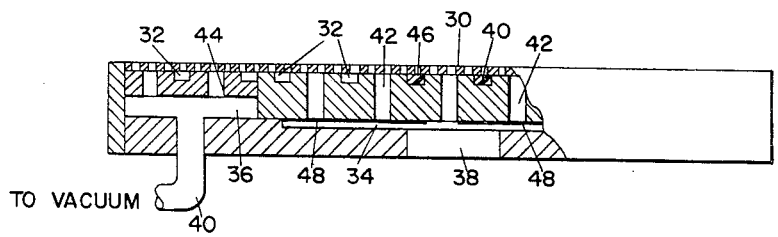
FIGURE 2 is a partly sectional view of a vacuum platen in accordance with the embodiment of the invention.

FIGURE 2 shows the details of the platen 10 in accordance with one embodiment of the invention. In this embodiment the upper portion of the platen consists of an air pervious screen 30 resting on a waffle-iron like pattern of slots 32. These slots 32 intersect to form a distributing grid underlying the screen 30.

Lying beneath the grid-like network formed by slots 32 is a first cavity 34 and a second first cavity 36. Cavity 34 is open to the atmosphere surrounding the platen through vent 38 while cavity 36 can be connected to means for creating a vacuum through pipe 40 so that it can be maintained at a pressure below atmospheric. In order to connect the cavity 34 to the grid, a plurality of apertures 42 extend from the bottom of slots 32 and open into the cavity 34. A large number of these apertures 42 are utilized to connect the slots and the cavity so that an area immediately beneath screen 30 which is at atmospheric pressure may be created in any of a great number of places. Apertures 44 connect the upper surface of the grid to the cavity 36 so that a vacuum or at least pressure lower than atmospheric can be applied thereto.

Figure 3:
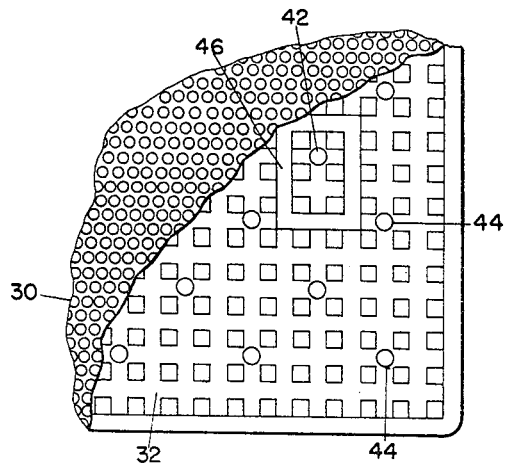
FIGURE 3 is a fragmentary, partly broken view of the upper surface of the vacuum platen of FIGURE 2.

In order to utilize the vacuum platen illustrated in FIGURES 2 and 3, certain areas thereof are first determined to correspond with the placement of an article to be packaged on the substrate. These areas are isolated from the remainder of the platen by encircling them with a resilient, air impervious gasket material 46 which is tightly forced into the slots 32. On the remainder of the platen the apertures 42 communicating with cavities 34 are blocked as with air impervious tape as shown at 48 in FIGURE 2. When a vacuum is applied to the network of slots 32 through cavity 36 and apertures 44, the entire face of the platen will be under a vacuum except those areas having open apertures 42 communicating with cavity 34 and which are also isolated from the other slots by the use of gasket material 46. Thus, when a porous substrate is positioned on the screen 30, a vacuum will be drawn through those portions overlying slots whose communication through apertures 42 with cavity 34 is blocked while little or no vacuum will be drawn through the porous substrate in those areas which are isolated from the remainder of the slots by the gasket material 46. When film draw down occurs, therefore, the amount which occurs around the article being packaged is lessened to the point where breakage, ridging, or puddling no longer occurs.

Figure 4:
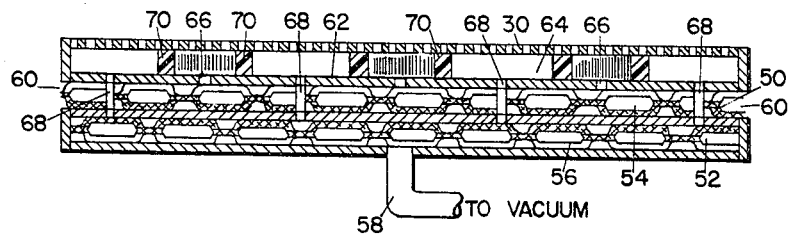
FIGURE 4 is a cross-sectional view of a vacuum platen in accordance with another embodiment of this invention.

In the embodiment of the invention illustrated in FIGURE 4, the upper portion of the platen consists of a porous screen 30' similar to the screen 30 utilized in the embodiment of the invention illustrated in FIGURE 2, a first cavity 50, and a second cavity 52. As shown in FIGURE 4 both the first cavity 50 and the second cavity 52 contain baffles 54 and 56 of expanded metal dividing them into a plurality of intersecting passageways to produce an even distribution of air flow and pressures within these cavities. As illustrated, the second cavity 52 is adapted to be connected to a device for creating a vacuum by means of pipe 58. On the other hand, the first cavity 50 is vented around its periphery to the atmosphere surrounding the platen through an opening 60. Thus, the first cavity 50 is maintained at atmospheric pressure while the second cavity 52 is adapted to be maintained at a pressure lower than atmospheric.

The porous screen 30' is spaced from the plate 62 forming the upper border of first cavity 50 resulting in an open space 64 underlying the entire extent of porous screen 30'. This open space 64 is connected to the first cavity through a plurality of conduits 66 and to the second cavity through a plurality of conduits 68. In order to isolate the open space 64 and the upper portion of the platen into areas which are at atmospheric pressure and areas in which a pressure lower than atmospheric is maintained, a resilient, air impervious gasket material 70 is utilized. This gasket material 70 is formed into closed geometrical figures having a shape and size corresponding to the base of the article to be packaged. The geometrical shape thus formed must be positioned so that conduit 66 from the first cavity 50 is contained within its borders. If a conduit 68 from the second cavity 52 also opens into this space, it can be plugged or otherwise rendered ineffective.

In operation of the platen illustrated in FIGURE 4, a porous substrate is placed on the screen 30' and positioned so that the articles to be packaged are over areas in the open space 64 which are isolated by the gasket material 70 into areas at atmospheric pressure. Thus, when vacuum is applied through cavity 52 and conduit 68 the packaging film will be forced into contact with the substrate in those areas corresponding to that portion of the open space 64 in which lower than atmospheric pressure is created.

In the embodiments of the invention illustrated in FIGURES 2 and 4, the platen may be modified to accommodate an infinite number of combinations of article placement and article number simply by shifting the positions of gasket material 70 or 46 along with the impervious tape 48 in the case of the invention illustrated in FIGURES 2 and 3, to new positions. Where long runs of articles are to be packaged the platen illustrated in FIGURE 5 has been found to be useful. This platen concludes a porous screen 30" overlying a large open space 72 the bottom of which consists of another porous screen 74 covering an expanding metal baffle 76 similar to the baffles 54, 56 of the embodiment of the invention illustrated in FIGURE 4. This baffle 76 serves to evenly distribute the flow of air and thus the low pressure created when the pipe 78 is connected to a device for creating a vacuum.

Disposed within the open space 72 are a plurality of compartments 80 which are vented to the atmosphere through a conduit 82. These compartments have an open side opening onto the porous screen 30" and serve to isolate that portion of the screen lying immediately thereabove from the vacuum created within the space 72. Thus, the objectives of this invention are achieved in this embodiment when the articles to be packaged are placed above the compartments 80 on a porous substrate resting upon the screen 30". As before, the packaging film draw-down in the area above compartments 80 will be controlled thereby preventing film breakage, ridging, puddling and the like.

Figure 5:
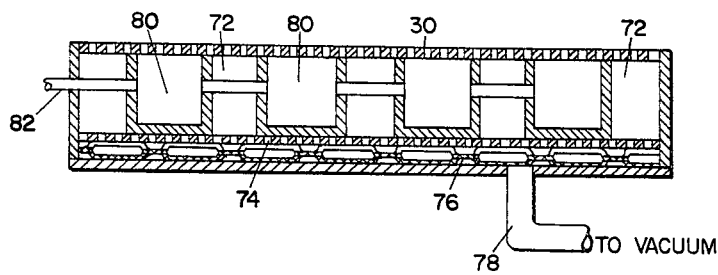
FIGURE 5 is a cross sectional view of a vacuum platen in accordance with still another embodiment of this invention.

Throughout the detailed description we have described the invention in terms of creating a vacuum over selected areas of the porous substrate while other areas remain at a higher pressure, generally atmospheric pressure. It is apparent, however, that the essential requirement is that a pressure differential be created in such a manner that the pressure in the area of the article to be packaged is higher than that created over the remainder of the area of the substrate. For example, using the embodiment of the invention as shown in FIGURE 5 as an illustration, the pressure across porous screen could be raised above atmospheric by moving air onto its surface at a relatively high velocity by utilizing a blower or large fan. A pressure higher than that created by the fan or blower could be applied to compartments 80 to create the desired end result. In this illustration the packaging film would be forced onto the substrate by the action of the external source of moving air but would not be drawn down excessively because of the pressure created in compartments 80.

If it is desired to achieve a close control of the degree of pressure differential produced on the support surface of the platen, valves, either manually or solenoid operated can be placed on the vent 38 of the embodiment of FIGURE 2, the opening 60 of the embodiment of FIGURE 4, or the conduit 82 of the embodiment of FIGURE 5. By partially closing such a valve, some degree of vacuum or low pressure would be produced in cavities 34, 52, and 72.

It is apparent that by following the teachings of our invention a vacuum platen may be produced which eliminates the problem of excessive packaging film drawdown, ridging, and puddling. By eliminating these problems the number of packages rejected because of these defects is reduced to a significant degree. Thus, productivity of the packaging apparatus and the men operating it is enhanced resulting in savings and time, money and capital. All of these desirable results are achieved by a device which is relatively easy to fabricate, inexpensive, and easily operated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. Apparatus adapted for use with a packaging machine comprising:
   (a) a platen adapted to support a porous substrate to which a thermoplastic sheet can be secured by pressure drawdown and adhesion whereby the substrate and sheet constitute a package for articles placed therebetween;
   (b) said platen including an upper portion and having a support surface adapted to be in contact with said substrate and having a plurality of air passages therein opening onto said support surface and adapted to be connected to means for creating a pressure differential in separate selected areas of said upper portions;
   (c) said means for creating a pressure differential including means for maintaining selected areas of said upper portion at a pressure less than that of the atmosphere surrounding said platen and means for maintaining selected areas of said upper portion at a pressure substantially equal to that of the atmosphere surrounding said platen thereby controlling the degree of pressure differential created in said areas whereby excessive film draw-down, ridging, and puddling of said thermoplastic sheet will be eliminated around articles placed in positions on said substrate corresponding to said areas on said upper portions maintained at substantially atmospheric pressure.

2. A platen according to claim 1 wherein said means for maintaining selected areas of said upper portion at atmospheric pressure includes at least one compartment in said platen beneath said upper portion and having:
   (a) an open side in communication with said upper portion whereby a fluid can flow between said upper portion and said compartment; and
   (b) a conduit connecting said compartment to the atmosphere surrounding said platen whereby said compartment and said selected areas of said upper portion are maintained at atmospheric pressure.

3. A platen according to claim 2 wherein said means for creating a pressure differential in selected areas of said upper portion includes means for connecting said air passages to means for creating a vacuum.

4. A platen according to claim 3 wherein an individual of said at least one compartment is of substantially the same size and shape as the base of the article to be packaged and is positioned in said platen below the points at which the article is to be packaged on said porous substrate.

5. A platen according to claim 3 wherein a plurality of said compartments are located in said platen each of which correspond substantially to the size and shape of the article to be packaged and are positioned in said platen below the point at which the articles are to be packaged on said porous substrate.

6. Packaging apparatus comprising:
a platen for supporting a porous substrate to which a thermoplastic sheet can be secured by pressure drawdown and adhesion to form a package for articles placed therebetween;
said platen including an upper portion and having a surface for supporting said substrate and a plurality of air passages therein opening onto said support surface and adapted to be connected to means for creating a pressure differential in related areas of said upper portion; said means including:
  (a) a plurality of intersecting slots in said support surface of said upper portion forming an interconnecting network for the flow of fluid across the face of said upper portion;
  (b) a cavity in said platen connected to said slots whereby a fluid can flow between said slots and said cavity;
  (c) means connected to said slots for creating a pressure lower than atmospheric in said slots;
  (d) means for maintaining said first cavity at a pressure equal to that of the atmosphere surrounding said platen;
  (e) means for isolating first selected areas of said upper portion from said cavity thereby producing lower than atmospheric pressure in said first selected areas;
  (f) means for isolating second selected areas of said upper portion from said means for creating pressure lower than atmospheric thereby maintaining said second selected areas at substantially atmospheric pressure whereby a flexible thermoplastic film will be drawn to a porous substrate positioned on said upper portion in said first selected areas but now drawn to the substrate in said second selected area.

7. A platen according to claim 6 wherein said cavity in said platen is vented to the atmosphere and extends beneath substantially all of said support surface of said upper portion, said cavity being connected to said slots by a plurality of closely spaced apertures in said slots distributed across substantially all the support surface of said upper portion.

8. A platen according to claim 7 wherein said means for isolating first selected area of said upper portion from said cavity comprises a fluid impervious member blocking said apertures which lie within said first selected areas.

9. A platen according to claim 8 wherein said means for isolating second selected areas of said upper portion comprises fluid impervious member having the depth and width of said slots removably placed in said slots and surrounding said second selected areas.

10. A platen according to claim 9 wherein said means for creating a pressure in said slots lower than atmospheric comprises:
  (a) a slotted surface in said upper portion adjacent said support surface, the slots in said slotted surface intersecting said slots and said support surface thereby being in fluid flow communication therewith;
  (b) a second cavity in said platen underlying said slotted surface;
  (c) a plurality of apertures extending between said slotted surface and said second cavity; and
  (d) means connecting said second cavity to a device for creating a vacuum.

11. Packaging apparatus comprising:
a platen for supporting a porous substrate to which a thermoplastic sheet can be secured by pressure drawdown and adhesion to form a package for articles placed therebetween;
said platen including an upper portion and having a surface for supporting said substrate and a plurality of air passages therein opening onto said support surface and adapted to be connected to means for creating a pressure differential in related areas of said upper portion; said means including:
  (a) a first cavity maintained at a pressure equal to that surrounding said platen beneath said upper portion;
  (b) a second cavity beneath said upper portion adapted to be connected to means for creating a pressure lower than the atmospheric pressure surrounding said platen;
  (c) at least one conduit opening into said upper portion and said second cavity;
  (d) at least one conduit opening into said upper portion and said first cavity; and
  (e) means for isolating said opening of said conduit from said second cavity from the opening of said conduit from said first cavity whereby areas of differential pressure are created in said upper portion and a substrate supported on said upper portion.

12. A platen according to claim 11 wherein said second cavity is adapted to be connected to means for creating a vacuum and said first cavity is open to the atmosphere.

13. A platen according to claim 12 wherein said means for isolating said openings includes a resilient, fluid impervious gasket ring having the size and shape of the article to be packaged and disposed around said openings from said first cavity lying beneath the point on said upper portion corresponding to the placement of the article on the porous substrate.

14. A method for film packaging comprising the steps of:
  (a) placing a porous substrate on the vacuum platen of a film packaging device;
  (b) placing the article to be packaged on and in contact with said substrate;
  (c) placing a packaging film across said substrate and said article;
  (d) isolating the area of the vacuum platen beneath said article from second areas of said vacuum platen whereby fluid flow between the two areas is eliminated thereby subjecting the bottom portion of the substrate to separate pressure environments; and
  (e) creating a pressure differential between said areas so that said second areas are at a pressure lower than that of a surrounding atmosphere and said area beneath said article is at substantially the same pressure as the surrounding atmosphere whereby said packaging film will be drawn into contact with the areas of said substrate corresponding to said second areas of said upper portion but will not be strongly drawn down around said article thereby eliminating excessive film draw-down and breakage as well as ridging and puddling of said film around said article.

15. A method according to claim 14 wherein a plurality of articles are placed on said substrate to be packaged and a corresponding plurality of atmospheric pressure areas are created in the upper portion of said platen and said substrate beneath said article.

16. A method according to claim 15 wherein the pressure differential is created before the packaging film is applied.

References Cited

UNITED STATES PATENTS

| | | | |
|---|---|---|---|
| 2,912,805 | 11/1959 | Maynard | 53—37 |
| 3,202,278 | 8/1965 | Taylor | 53—22 X |
| 3,358,829 | 12/1967 | Smith et al. | |

TRAVIS S. McGEHEE, Primary Examiner

U.S.Cl. X.R.

53—112